United States Patent [19]

Ashida et al.

[11] Patent Number: 4,940,779

[45] Date of Patent: Jul. 10, 1990

[54] METHOD FOR THE PREPARATION OF A POLYCARBONATE POWDER

[75] Inventors: Takashi Ashida; Koji Yamamoto, both of Ichihara, Japan

[73] Assignee: Idemitsu Petrochemical Co., Ltd., Tokyo, Japan

[21] Appl. No.: 328,720

[22] Filed: Mar. 23, 1989

Related U.S. Application Data

[63] Continuation of Ser. No. 164,533, Mar. 7, 1988, abandoned.

[30] Foreign Application Priority Data

Mar. 30, 1987 [JP] Japan ................................. 62-74250

[51] Int. Cl.$^5$ ............................................. C08G 17/13
[52] U.S. Cl. ..................................... 528/495; 528/493; 528/494
[58] Field of Search ......................... 528/493, 494, 495

[56] References Cited

U.S. PATENT DOCUMENTS 3,213,060 10/1965 Jackson et al. ..................... 528/494
3,264,263 8/1966 Baker .................................. 528/498
3,264,264 8/1966 Baker .
3,668,181 2/1972 Oxenrider ........................... 528/498

Primary Examiner—Harold D. Anderson
Assistant Examiner—T. Mosley
Attorney, Agent, or Firm—Frishauf, Holtz, Goodman and Woodward

[57] ABSTRACT

A solution of a polycarbonate resin in a good solvent of the resin is introduced concurrently but separately or as mixed with a poor solvent of the resin into a blending machine of self-cleaning type and heated and devolatilized therein so that a fine powder of the resin having a uniform particle size distribution and large bulk density can be easily obtained.

14 Claims, No Drawings

METHOD FOR THE PREPARATION OF A POLYCARBONATE POWDER

This application is a continuation of application Ser. No. 07/164,533, filed Mar. 7, 1988, now abandoned.

BACKGROUND OF THE INVENTION

The present invention relates to a method for the preparation of a polycarbonate powder or, more particularly, to a method for the preparation of a polycarbonate powder having a large bulk density and a fine and uniform particle size distribution from a solution of the resin.

Known methods in the prior art for the preparation of a polycarbonate powder from a solution of the resin include a method by using a double-screw kneader having a set of spiral blades for material transfer in a direction and a second set of spiral blades for material transfer in a reverse direction disclosed in Japanese Patent Publication No. 53-15899 and a method for the pulverization of the resin by using a poor solvent for the resin disclosed in Japanese Patent Kokai No. 49-28642.

The former method is disadvantageous because the polycarbonate powder obtained by this method has a relatively large particle size sometimes necessitating subsequent pulverization in a down-stream process in order to facilitate drying. The latter method is also disadvantageous in respect of the low bulk density of the powder to cause a problem in obtaining a sufficiently high feed rate in an extruder although the method is suitable for obtaining a fine powder of the resin in the form of precipitates.

SUMMARY OF THE INVENTION

The inventors accordingly have conducted extensive investigations with an object to develop a method for the preparation of a polycarbonate powder free from the above mentioned problems and disadvantages in the prior art methods arriving, as a result, at a discovery that, when a solution of the resin in a good solvent and a poor solvent of the resin are introduced into a blending machine of self-cleaning type to be heated and devolatilized therein, a polycarbonate powder having a large bulk density and a fine and very uniform particle diameter can be obtained out of the discharge port.

Thus, the method of the present invention for the preparation of a polycarbonate powder from a solution of the polycarbonate comprises introducing a solution of a polycarbonate resin in a good solvent of the resin and a poor solvent of the resin into a blending machine of self-cleaning type either separately or as mixed together beforehand and heating and devolatilizing the same therein.

DETAILED DESCRIPTION OF THE PREFERRED EMBODIMENTS

The method of the present invention is carried out by using, on one hand, a solution of a polycarbonate resin which should be a solution of the resin in a good solvent. Any kind of polycarbonate resin products can be used in the inventive method irrespective of the manufacturing process of the resin which may be the ester-exchange method or the phosgene method. It is convenient that the inventive method is performed as a down-stream process of the phosgene method because the reaction mixture after completion of the reaction in the phosgene method is a solution of the polycarbonate resin in a good solvent which can be used as such as the starting material in the inventive method.

The good solvent of polycarbonate resins here implied is exemplified by methylene chloride, tetrachloro ethane, trichloro ethane, chloroform, dioxane and tetrahydrofuran as well as mixtures thereof, of which methylene chloride is particularly preferable. The solution of the polycarbonate resin in a good solvent should contain the resin in a concentration in the range from 5 to 50% by weight or, preferably, from 10 to 40% by weight.

The poor solvent of polycarbonate resins here implied, on the other hand, is defined to be an organic solvent in which the resin cannot be dissolved in a concentration of 3% by weight or larger. Such a poor solvent is exemplified by aliphatic hydrocarbon solvents such as hexane, heptane, pentane and the like, aromatic hydrocarbon solvents such as benzene, toluene, xylene and the like, alcohols such as methyl alcohol, ethyl alcohol, propyl alcohol and the like, ketones such as acetone, methyl ethyl ketone and the like, and ethers as well as mixtures thereof.

The poor solvent of the polycarbonate resin is used in an amount in the range from 5 to 150% by weight or, preferably, from 10 to 100% by weight based on the amount of the resin contained in the solution. When the amount of the poor solvent is too small, disadvantages are caused that the resin may eventually adhere to the casing of the blending machine to cause difficulties in driving of the machine or the resin powder product may have a coarse particle size distribution. When the amount of the poor solvent is too large, on the other hand, the polycarbonate resin may precipitate in the liquid medium to cause phase separation into two layers of solid and liquid.

Although the above described solution of the polycarbonate resin in a good solvent and the poor solvent of the resin may be introduced separately into the blending machine, it is preferable that the solution and the solvent are mixed together in advance by using a suitable mixer such as line mixers, static mixers and the like and the mixture is introduced into the blending machine of self-cleaning type described below.

At any rate, the inventive method is carried out by introducing the solution of a polycarbonate resin in a good solvent and a poor solvent of the resin into a blending machine of self-cleaning type either separately or as a mixture to effect heating and devolatilization of the mixture therein.

The blending machine of self-cleaning type used in the inventive method can be any of blending machines having functions of self-cleaning and kneading. Various blending machines of self-cleaning type are known in the art, of which particularly suitable are those described in U.S. Pat. Nos. 3,195,865 and 3,198,491 and elsewhere. These blending machines of self-cleaning type are constructed by fixing paddles to a pair of two parallel shafts. Each of the paddles has protrusions in the form of something like a round-cornered triangle or a convex lens and, when the shafts are rotated in the same direction, the inner walls of the cylinder are scraped by the protrusions of the paddles. Simultaneously, the paddle on one shaft scrapes the surface of the paddle on the other shaft at the protrusions so as to effect self-cleaning simultaneously with kneading. The kneaded material in the blending machine can be discharged out of the machine by means of a suitable mechanism such as a screw conveyor or by using paddles in a screw-like structure. Other blending machines of self-cleaning type suitable for use in the inventive method include those described in Japanese Patent Publication No. 60-54974 and Japanese Patent Kokai Nos. 56-59824, 60-239211 and 60-101108.

A particularly preferable blending machine of self-cleaning type should have such a structure that no opening is provided in the upper part of the paddles within the zone where pulverization of the resin proceeds or, in other words, the zone excepting the vicinities of the feed port of the starting materials and the discharge port of the kneaded material and that the effect of self-cleaning can be obtained on all portions coming into contact with the material under treatment including the inner walls of the cylinder and surfaces of the paddles. Particularly preferable blending machines satisfying these requirements are the unidirectionally engageable double-shaft blending machines of which several machines are commercially available including the Model KRC kneaders of self-cleaning type manufactured by Kurimoto, Ltd. and Model SCR reactors of self-cleaning type manufactured by Mitsubishi Heavy Industries Ltd.

Although any of the blending machines of self-cleaning type described above can be used in the inventive method, it is preferable that the temperature of the jacket can be controlled within a range of 50° to 150° C. It is also desirable that the clearance between the inner walls of the cylinder and the peripheries of the paddles does not exceed 10 mm or, preferably, 5 mm from the standpoint of controllability of the particle size distribution of the polycarbonate powder product.

In practicing the method of the present invention, a solution of the polycarbonate resin in a good solvent and a poor solvent of the resin are introduced into the feed port of the above described blending machine of self-cleaning type and they are kneaded together by means of the paddles with simultaneous heating at a controlled temperature by passing a hot heating medium through the jacket of the blending machine. The thus produced polycarbonate powder is continuously discharged out of the blending machine from the discharge port while the solvents are vaporized and discharged from the exhaust port of the blending machine to effect devolatilization.

In the following, examples are given to illustrate the method of the invention in more detail but not to limit the scope of the invention in any way.

EXAMPLE 1

Into a feed port of a kneader of self-cleaning type (Model KRC, manufactured by Kurimoto, Ltd.) having no opening in the upper part of the paddles, of which the blades had a diameter of 50 mm and the clearance between the inner walls of the cylinder and the peripheries of the paddles was 1 mm, were separately introduced a 25% by weight methylene chloride solution of a polycarbonate resin and n-heptane at rates of 8.0 kg/hour and 0.7 kg/kg resin, respectively, and they were blended together in the kneader with simultaneous heating and devolatilization by keeping the jacket of the kneader at 60° C. In this manner, a polycarbonate powder having a relatively uniform particle size distribution was continuously discharged out of the discharge port. A screening test of the thus obtained powdery product indicated that at least 97% by weight of the particles could pass a screen of 14 meshes per inch. The powder had a bulk density of 0.5 g/cm$^3$. The resin powder was continuously produced at a rate of 2 kg/hour.

EXAMPLE 2

The experimental procedure was substantially the same as in Example 1 except that the feed rate of n-heptane was decreased to 0.5 kg/kg resin. Table 1 below gives the data of the weight proportion in % of the particles passing a screen of 14 meshes, bulk density and hourly production rate of the polycarbonate powder.

EXAMPLE 3

Into the feed port of a reactor of self-cleaning type (Model SCR, manufactured by Mitsubishi Heavy Industries Ltd.) having no openings in the upper part of the paddles, of which the blades had a diameter of 60 mm and the clearance between the inner walls of the cylinder and the peripheries of the paddles was 1 mm, were separately and continuously introduced a 34% by weight methylene chloride solution of a polycarbonate resin and n-heptane at rates of 7.0 kg/hour and 0.7 kg/kg resin, respectively, and they were blended together with simultaneous heating and devolatilization by keeping the jacket of the reactor at 90° C. In this manner, a polycarbonate powder having a relatively uniform particle size distribution was obtained continuously from the discharge port of the reactor. Table 1 below gives the data of the weight proportion in % of the particles passing a screen of 14 meshes, bulk density and hourly production rate of the polycarbonate powder product.

EXAMPLE 4

The experimental procedure was substantially the same as in Example 1 except that the poor solvent of the polycarbonate resin was toluene instead of n-heptane and the feed rate thereof was decreased to 0.5 kg/kg resin. Table 1 below gives the data of the weight proportion in % of the particles passing a screen of 14 meshes, bulk density and hourly production rate of the polycarbonate resin powder.

EXAMPLE 5

The experimental procedure was substantially the same as in Example 3 except that the poor solvent of the polycarbonate resin was toluene instead of n-heptane and the feed rate thereof was decreased to 0.5 kg/kg resin. Table 1 below gives the data of the weight proportion in % of the particles passing a screen of 14 meshes, bulk density and hourly production rate of the polycarbonate resin powder as the product.

COMPARATIVE EXAMPLE 1

A 30% by weight methylene chloride solution of a polycarbonate resin was continuously introduced at a rate of 30 kg/hour into the feed port of a conventional double-shaft kneader of the same type as disclosed in Japanese Patent Kokai No. 53-15899 and heated and devolatilized therein by keeping the jacket at 90° C. A polycarbonate resin powder was continuously discharged out of the discharge port of the kneader. Table 1 below gives the data of the weight proportion in % of the particles passing a screen of 14 meshes, bulk density and hourly production rate of the polycarbonate resin powder as the product.

COMPARATIVE EXAMPLE 2

The experimental procedure was substantially the same as in Comparative Example 1 except that n-heptane as a poor solvent of the polycarbonate resin was continuously introduced into the feed port of the kneader together with the solution of the resin at a rate of 0.67 kg/kg resin. A polycarbonate resin powder was continuously discharged out of the discharge port of the kneader, of which Table 1 below gives the data of the weight proportion in % of the particles passing a screen of 14 meshes, bulk density and hourly production rate.

COMPARATIVE EXAMPLE 3

The experimental procedure was substantially the same as in Example 1 except that n-heptane as a poor solvent of the resin introduced into the kneader was omitted. The result was that adherence of the resin on the walls of casing took place so that the kneader could no longer be operated.

COMPARATIVE EXAMPLE 4

The experimental procedure was substantially the same as in Example 3 except that n-heptane as a poor solvent of the resin introduced into the kneader was omitted. The result was that adherence of the resin on the walls of casing took place so that the kneader could no longer be operated.

EXAMPLE 6

The experimental conditions were substantially the same as in Example 2 except that the solution of the polycarbonate resin and n-heptane were introduced into the feed port of the kneader not separately but after preparatory mixing by use of a line mixer (Homomic Line Mixer Model PL-2SL, manufactured by Tokushu Kika Kogyo Co., Ltd.). A polycarbonate resin powder was continuously discharged out of the discharge port of the kneader, of which Table 1 below gives the data of the weight proportion in % of the particles passing a screen of 14 meshes, bulk density and hourly production rate.

The results summarized in Table 1 support the following conclusions. Namely, use of a conventional double-shaft kneader alone results in a coarser particle size distribution of the resin powder product as is shown by Comparative Example 1 and this drawback cannot be dissolved even by the combined use of a poor solvent as is shown by Comparative Example 2. When a blending machine of self-cleaning type suitable for practicing the method of the invention is used but with omission of the poor solvent, the machine cannot be operated as is shown by Comparative Examples 3 and 4. In contrast thereto, a fine polycarbonate powder of a large bulk density can be obtained according to the inventive method as is shown by Examples 1 to 5. Furthermore, preparatory mixing of the resin solution and the poor solvent of the resin by use of a line mixer provides a possibility of remarkably increasing the production rate of the powder product using the same blending machine.

To summarize the advantages of the invention, a method has been established for the preparation of a polycarbonate powder of a large bulk density having a fine and uniform particle size distribution so that the resin powder product of the invention can be used as such without the expensive process of subsequent pulverization and particle size classification.

TABLE 1

| | Blending machine | Openings in the upper part of paddles | Poor solvent (feed rate, kg/kg resin) | Proportion of particles passing 14 mesh screen, % | Rate of Bulk density, g/cm$^3$ | production, kg/hour |
|---|---|---|---|---|---|---|
| Example 1 | KRC | No | n-Heptane (0.7) | 97 | 0.4 | 2 |
| Example 2 | KRC | No | n-Heptane (0.5) | 97 | 0.5 | 2 |
| Example 3 | SCR | No | n-Heptane (0.7) | 95 | 0.4 | 4 |
| Example 4 | KRC | No | Toluene (0.5) | 90 | 0.4 | 3 |
| Example 5 | SCR | No | Toluene (0.5) | 90 | 0.4 | 3 |
| Comparative Example 1 | Conventional | Yes | — | 40 | 0.6 | 4 |
| Comparative Example 2 | Conventional | Yes | n-Heptane (0.67) | 50 | 0.4 | 4 |
| Comparative Example 3 | KRC | No | — | (inoperable) | | |
| Comparative Example 4 | SCR | No | — | (inoperable) | | |
| Example 6 | KRC | No | n-Heptane (0.5) | 97 | 0.5 | 7 |

What is claimed is:

1. A method for the preparation of a polycarbonate resin powder from a solution of the resin which comprises blending together a solution of polycarbonate resin in a good solvent of the resin selected from the group consisting of methylene chloride, tetrachloroethane, tricholorethane, chloroform, dioxane and tetrahydrofuran; and a poor solvent of the resin selected from the group consisting of aliphatic hydrocarbon solvents, aromatic hydrocarbon solvents, alcohols, ketones, and ethers, in a blending machine of self-cleaning type either separately or as mixed together before to form a mixture thereof and removing the solvents to recover said polycarbonate resin powder, said blending machine being of the type having paddles fixed to a pair of parallel shafts around which they rotate in a cylindrical chamber and scrape an inner wall of the chamber; and controlling the particle size distribution in the polycarbonate powder by maintaining a clearance between the paddles and the inner wall of not more than 10 mm.

2. The method according too claim 1 wherein the solution of the resin and the poor solvent of the resin are introduced into the blending machine as mixed together beforehand by use of a mixer.

3. The method according to claim 1 wherein the solution of the polycarbonate resin in a good solvent of the resin contains from 5 to 50% by weight of the resin.

4. The method according to claim 1 wherein the amount of the poor solvent of the resin introduced into the blending machine is in the range from 5 to 150% by weight based on the amount of the polycarbonate resin introduced into the blending machine in the form of the solution.

5. The method according to claim 1 wherein the solvents are removed by heating the mixture to a temperature range of from 50° to 150° C.

6. The method according to claim 1, further comprising the step of mixing the solution of the resin and the poor solvent for the resin in a mixer before the step of introducing into a blending machine, and thereafter heating the mixture to remove the solvents and to recover said polycarbonate resin powder.

7. A method for the preparation of a polycarbonate resin powder from a solution of the resin which comprises introducing into a blending machine of a self-cleaning type a solution of the polycarbonate resin in a good solvent of the resin selected from the group consisting of methylene chloride, tetrachloroethane, trichloroethane, chloroform, dioxane and tetrachloroethane, tricholoroethane, chloroform, dioxane and tetrahydrofuran, wherein the solution of the polycarbonate resin in said good solvent of the resin contains from 5 to 50% by weight of the resin; and a poor solvent of the resin selected from the group consisting of aliphatic hydrocarbon solvents, aromatic hydrocarbon solvents, alcohols, ketones and ethers, wherein the amount of said poor solvent of the resin introduced into the blending machine is in the range from 5 to 150% by weight based on the amount of the polycarbonate resin introduced into the blending machine in the form of the solution, blending the solution and the poor solvent in said blending machine to form a mixture thereof; and removing the solvents from the mixture to recover said polycarbonate resin powder, wherein said blending machine being of the type having paddles fixed to a pair of parallel shafts around which they rotate in a cylindrical chamber and scrape an inner wall of the chamber; and controlling the particle size distribution in the polycarbonate powder by maintaining a clearance between the paddles and the inner wall of not more than 10 mm.

8. The method according to claim 7 wherein the solution of the polycarbonate resin in the good solvent contains 10% to 40% by weight of resin.

9. The method according to claim 6 wherein the amount of said poor solvent is 10% to 100% by weight based on the amount of polycarbonate resin introduced.

10. The method according to claim 7 wherein the amount of said poor solvent is 10% to 100% by weight based on the amount of polycarbonate resin introduced.

11. The method of claim 1 wherein the clearance is maintained at not more than 5 mm.

12. The method of claim 11 wherein the clearance is maintained at 1 mm.

13. The method of claim 7 wherein the clearance is maintained at not more than 5 mm.

14. The method of claim 13 wherein the clearance is maintained at 1 mm.

* * * * *

UNITED STATES PATENT AND TRADEMARK OFFICE
CERTIFICATE OF CORRECTION

PATENT NO. : 4,940,779

DATED : July 10, 1990

INVENTOR(S) : ASHIDA et al

It is certified that error appears in the above-identified patent and that said Letters Patent is hereby corrected as shown below:

In the title page, under "OTHER DOCUMENTS", insert:

--CHEMICAL ABSTRACTS, Vol.81, No.20, 18th Nov. 1974, page 50, Abstract No.121724v. Columbus, Ohio, U.S.; & JP-A-74 28 642 (IDEMITSU KOSAN CO., LTD.) 14-03-1974 Abstract.--

Signed and Sealed this

Ninth Day of June, 1992

*Attest:*

DOUGLAS B. COMER

*Attesting Officer*   *Acting Commissioner of Patents and Trademarks*